United States Patent
Watanabe

(10) Patent No.: US 7,643,554 B2
(45) Date of Patent: Jan. 5, 2010

(54) IMAGE RETRIEVING APPARATUS PERFORMING RETRIEVAL BASED ON CODING INFORMATION UTILIZED FOR FEATURE FRAME EXTRACTION OR FEATURE VALUES OF FRAMES

(75) Inventor: Shuichi Watanabe, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 613 days.

(21) Appl. No.: 09/451,097

(22) Filed: Nov. 30, 1999

(65) Prior Publication Data

US 2003/0202585 A1    Oct. 30, 2003

(30) Foreign Application Priority Data

Nov. 30, 1998    (JP)    ............. 10-338658

(51) Int. Cl.
*H04N 7/12* (2006.01)
*H04B 1/66* (2006.01)

(52) U.S. Cl. ............................................... 375/240.08

(58) Field of Classification Search .....................
375/240.01–240.25, 240.29; 348/699, 700; 345/474; 382/238, 236, 154; 386/111, 69
See application file for complete search history.

(56) References Cited

U.S. PATENT DOCUMENTS

| | | | | |
|---|---|---|---|---|
| 5,473,379 | A * | 12/1995 | Horne | 375/240.16 |
| 5,510,834 | A * | 4/1996 | Weiss et al. | 348/97 |
| 5,625,417 | A | 4/1997 | Lee | |
| 5,642,174 | A * | 6/1997 | Kazui et al. | 348/700 |
| 5,754,233 | A * | 5/1998 | Takashima | 348/700 |
| 5,805,746 | A * | 9/1998 | Miyatake et al. | 382/236 |
| 5,809,202 | A | 9/1998 | Gotoh et al. | |
| 5,892,520 | A * | 4/1999 | Ioka et al. | 345/474 |
| 5,903,674 | A * | 5/1999 | Ooi | 382/238 |
| 5,978,030 | A * | 11/1999 | Jung et al. | 375/240.16 |
| 5,990,955 | A * | 11/1999 | Koz | 375/240.01 |
| 6,046,774 | A * | 4/2000 | Heo et al. | 375/240.16 |
| 6,052,417 | A * | 4/2000 | Fujiwara et al. | 375/240.12 |
| 6,072,542 | A * | 6/2000 | Wilcox et al. | 348/722 |
| 6,078,617 | A * | 6/2000 | Nakagawa et al. | 375/240 |
| 6,078,726 | A | 6/2000 | Gotoh et al. | |
| 6,101,222 | A * | 8/2000 | Dorricott | 375/240 |
| 6,148,030 | A * | 11/2000 | Katata et al. | 375/240.1 |
| 6,167,190 | A * | 12/2000 | Nagasawa | 386/111 |
| 6,400,890 | B1 * | 6/2002 | Nagasaka et al. | 386/69 |
| 6,473,459 | B1 * | 10/2002 | Sugano et al. | 375/240.16 |

(Continued)

FOREIGN PATENT DOCUMENTS

EP    0 597 450 A2    5/1994

(Continued)

*Primary Examiner*—Nhon T Diep
(74) *Attorney, Agent, or Firm*—Birch, Stewart, Kolasch & Birch, LLP

(57) ABSTRACT

An image retrieval information storing apparatus capable of extracting a featured frame adaptively in the process of retrieval includes a coding information reading unit reading prescribed coding information which will be information representing frame feature among coded image data, a frame feature value generating unit connected to the coding information reading unit and generating a frame feature value which is a numerical representation of the frame feature based on the coding information, and a frame feature value storing unit connected to the frame feature value generating unit and storing the frame feature value in correspondence with each frame of the image data.

6 Claims, 15 Drawing Sheets

U.S. PATENT DOCUMENTS 6,496,598 B1 * 12/2002 Harman ..................... 382/154
2003/0118117 A1 * 6/2003 McVeigh et al. ....... 375/240.29

FOREIGN PATENT DOCUMENTS

| EP | 0878 767 A1 | 11/1998 |
|---|---|---|
| JP | 6-149902 A | 5/1994 |
| JP | 6-165107 A | 6/1994 |
| JP | 07-236115 A | 9/1995 |
| JP | A-9261648 | 10/1997 |
| JP | A-9284702 | 10/1997 |
| JP | A-10 23421 | 1/1998 |
| JP | 10-224779 A | 8/1998 |
| WO | WO 96/29828 A1 | 9/1996 |

* cited by examiner

IMAGE RETRIEVING APPARATUS PERFORMING RETRIEVAL BASED ON CODING INFORMATION UTILIZED FOR FEATURE FRAME EXTRACTION OR FEATURE VALUES OF FRAMES

BACKGROUND OF THE INVENTION

1. Field of the Invention

The present invention relates to an image retrieval information storing apparatus and an image retrieving apparatus, retrieving an image based on the image retrieval information. More specifically, the present invention relates to an image retrieval information storing apparatus and an image retrieving apparatus, using coding information utilized for featured frame extraction or feature values of respective frames, as image retrieval information.

2. Description of the Background Art

When a user retrieves a motion picture, it is important that the user recognizes the contents of the motion picture, that is, what is the object picked up in the motion picture. Except when the motion picture has a text title or description, in most cases it is necessary for the user to confirm the contents by playing the whole motion picture. As the number of motion pictures among which a desired one is to be retrieved increases, it becomes harder for the user to play the motion pictures one by one and to confirm the contents thereof, and the efficiency of retrieval is quite poor. The efficiency of retrieval further lowers when each motion picture is in the form of coded compressed data requiring decoding and reproduction before retrieval. In order to solve this problem, a method of retrieval may be effective in which one or a plurality of frames characteristic of the motion picture, typically representing the contents of the motion picture are extracted and displayed, so that the contents of the motion picture can be displayed in schematic manner.

The characteristic frame (hereinafter referred to as featured frame) used for motion picture retrieval includes, for example, a scene change frame. Japanese Patent Laying-Open No. 9-261648 discloses a method in which a scene change frame is extracted, based on prediction mode information included in image data, from image data coded in accordance with interframe prediction coding. Over one frame, the number of I blocks which are coded in accordance with intraframe prediction, P blocks coded in accordance with forward interframe prediction, B blocks coded in accordance with backward interframe prediction and Bi blocks coded in accordance with bidirectional interframe prediction are counted. Frequency information of respective blocks reflects correlation among frames in the motion picture. Thus, based on the frequency information of each block, a frame immediately following a scene change (= scene change frame) is detected. Further, Japanese Patent Laying-Open No. 10-23421 discloses a method of extracting a scene change frame, based on the change in amount of each piece of coding information contained in the coded image data. A conventional image retrieval information storing apparatus in accordance with the prior art is as shown in FIG. 14.

Referring to FIG. 14, the conventional image retrieval information storing apparatus includes a coding information reading unit 1401, a frame feature value generating unit 1402 connected to coding information reading unit 1401, an index information generating unit 1403 connected to frame feature value generating unit 1402, and an index information storing unit 1404 connected to index information generating unit 1403.

Coding information reading unit 1401 reads, according to Japanese Patent Laying-Open No. 9-261648, block by block prediction mode information from coded image data, and reads, according to Japanese Patent Laying-Open No. 10-23421, respective pieces of coding information of different types. Frame feature value generating unit 1402 calculates, from the various pieces of coding information read by coding information reading unit 1401, frequency of respective prediction mode blocks according to Japanese Patent Laying-Open No. 9-261648, and calculates accumulated value of amount of respective pieces of coding information according to Japanese Patent Laying-Open No. 10-23421. Index information generating unit 1403 determines the scene change frame which is the featured frame, based on the frame by frame feature value obtained in frame feature value generating unit 1402, that is, frequency information of respective prediction mode blocks according to Japanese Patent Laying-Open No. 9-261648, and accumulated amount of respective pieces of coding information according to Japanese Patent Laying-Open No. 10-23421. Index information generating unit 1403 outputs positional information of the scene change frame as index information. Index information storing unit 1404 stores the index information output from the index information generating unit 1403 as image retrieval information.

FIG. 15 represents a conventional image retrieving apparatus using the image retrieval information stored in this manner. Referring to FIG. 15, the conventional image retrieving apparatus includes an image retrieval executing unit 1501 executing retrieval using the image retrieval information and the coded image data as inputs and outputting the results of retrieval.

The featured frame includes, in addition to the scene change frame, a scene change frame based on rapid/slow movement, disclosed in Japanese Patent Laying-Open No. 9-284702. According to the invention disclosed in Japanese Patent Laying-Open No. 9-284702, a motion vector for detecting a scene change frame is obtained from the original image, not from the coded information, and the scene change frame is detected based on the total sum of motion vectors in a frame.

In the above described conventional image retrieval information storing apparatus, positional information of the extracted featured frame is obtained, and the positional information only is stored as the index information. Therefore, even when a plurality of images which are the objects of retrieval have mutually different features, only a featured frame representing one same feature only can be obtained. If feature frames reflecting features of respective images are to be obtained, it is necessary for the user to again generate the image retrieval information from the coded image data. In the process of retrieval, when featured frames corresponding to various features of images which are the object of retrieval are to be taken out in an interactive manner, re-generation of the image retrieval information from the coded image data significantly lowers retrieval efficiency. Further, preparation of featured frame indexes corresponding to every possible features for all the image data is not practical. Further, it is not possible by the prior art to meet with high efficiency a request for extracting a featured frame which has not been expected by the provider providing the image retrieval information.

SUMMARY OF THE INVENTION

The present invention was made to solve the above described problems, and its object is to provide an image retrieval information storing apparatus capable of immediately meeting a request for switching featured frames in the process of retrieval and capable of extracting a featured frame adaptively.

Another object of the present invention is to provide an image retrieving apparatus capable of high speed image retrieval processing.

A still further object of the present invention is to provide an image retrieving apparatus capable of high speed image retrieval processing and allowing reduction in capacity used for storing data necessary for retrieval.

A still further object of the present invention is to provide an image retrieving apparatus which can flexibly meet a user's request for extracting a featured frame.

A still further object of the present invention is to provide an image retrieving apparatus which can flexibly meet a users request for extracting a featured frame and which is capable of high speed retrieval processing.

According to an aspect of the present invention, the image retrieval information storing apparatus includes: a coding information reading unit reading prescribed coding information which will be information representing frame features among coded image data; a frame feature value generating unit connected to the coding information reading unit, generating a frame feature value which is a numerical representation of frame features, based on the coding information; and a frame feature value storing unit connected to the frame feature value generating unit, and storing the frame feature value in correspondence with each frame of the image data.

The frame feature value of each frame necessary for extracting a featured frame is stored. Therefore, in the process of retrieval, it is possible to meet a request for switching a featured frame immediately, whereby adaptive extraction of a featured frame is possible.

According to another aspect, the image retrieval information storing apparatus includes: a coding information reading unit reading prescribed coding information which will be information representing frame features among coded image data; and a coded information storing unit connected to the coding information reading unit, and storing coding information in correspondence with each frame of the image data.

The coding information necessary for extracting a featured frame is stored. Therefore, in the process of retrieval, it is possible to meet a request for switching a featured frame immediately, whereby adaptive extraction of a featured frame is possible.

According to a still further aspect, an image retrieval information storing apparatus includes: a coding information reading unit reading prescribed coding information which will be information representing frame features among coded image data; a frame feature value generating unit connected to the coding information reading unit, and generating a frame feature value which is a numerical representation of frame features based on the coding information; and a storing unit connected to the coding information reading unit and the frame feature value generating unit, and storing the coding information and the frame feature value in correspondence with each frame of the image data.

The frame feature value frame by frame and the coding information necessary for extracting a featured frame are stored. Therefore, in the process of retrieval, it is possible to meet a request for switching a featured frame immediately, whereby adaptive extraction of a featured frame is possible.

In accordance with a further aspect of the present invention, the image retrieving apparatus includes: an index information generating unit receiving a frame feature value which is a numerical representation of frame features corresponding to each frame of the coded image data, determining a featured frame among the image data based on the frame feature value in accordance with a request for extracting a featured frame, and generating index information which is positional information of the featured frame; and a image retrieval executing unit connected to the index information generating unit, transmitting a request for extracting a featured frame to the index information generating unit, receiving the index information from the index information generating unit, receiving image date from outside and outputting a frame specified based on the index information.

The featured frame is extracted based on the frame feature value. Therefore, high speed retrieval processing is possible, and capacity used for storing data necessary for retrieval can be reduced.

In accordance with a still further aspect, the image retrieving apparatus includes: a frame feature value generating unit receiving prescribed coding information included in coded image data, which will be information representing frame features, and generating a frame feature value which is a numerical representation of the frame features, based on coding information in accordance with a request for extracting a frame feature value; an index information generating unit connected to the frame feature value generating unit, receiving the frame feature value from the frame feature value generating unit, determining a featured frame among the image data based on the frame feature value in response to a request for extracting the featured frame, and generating index information which is positional information of the featured frame; and a image retrieval executing unit connected to the frame feature value generating unit and the index information generating unit, transmitting a request for extracting frame feature value to the frame feature value generating unit, transmitting a request for extracting a featured frame to the index information generating unit, receiving index information from the index information generating unit, receiving image data from outside, and outputting a frame specified based on the index information.

The frame feature value is generated based on the coding information. Therefore, when there is a new request for extracting a frame feature value, the method of generating the frame feature value for extracting the feature frame is changed in the process of retrieval. Therefore, it is possible to flexibly meet the users request for extracting the featured frame.

In accordance with a still further aspect of the present invention, the image retrieving apparatus includes: a frame feature value generating unit receiving prescribed coding information included in coded image data, which will be information representing frame features, and generating a frame feature value which is a numerical representation of frame features based on the coding information in response to a request for extracting the frame feature value; an index information generating unit connected to the frame feature value generating unit, receiving frame feature values from the frame feature value generating unit and from the outside, determining a featured frame among image data based on the frame feature values in response to a request for extracting a featured frame, and generating index information which is positional information of the featured frame; and a image retrieval executing unit connected to the frame feature value generating unit and the index information generating unit, transmitting a request for extracting frame feature value to the frame feature value generating unit, transmitting a request for extracting a featured frame to index information generating unit, receiving index information from the index information generating unit, receiving image data from the outside, and outputting a frame specified based on the index information.

A new featured frame is extracted in accordance with the request for extracting the featured frame and the request for extracting frame feature value generated in the process of executing image retrieval, and with the coding information and the frame feature value. Accordingly, flexible image retrieval is possible, and high speed retrieving process based on the frame feature value is possible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following description of the embodiments of the present invention, a scene change frame and a frame in which rapid movement is locally observed are extracted as featured frames, by way of example, using motion vector information and coding prediction mode information among coding information included in the image data. The configuration of the present invention is also applicable when other coding information is used or when other featured frames are to be extracted.

First Embodiment

Figure 1:
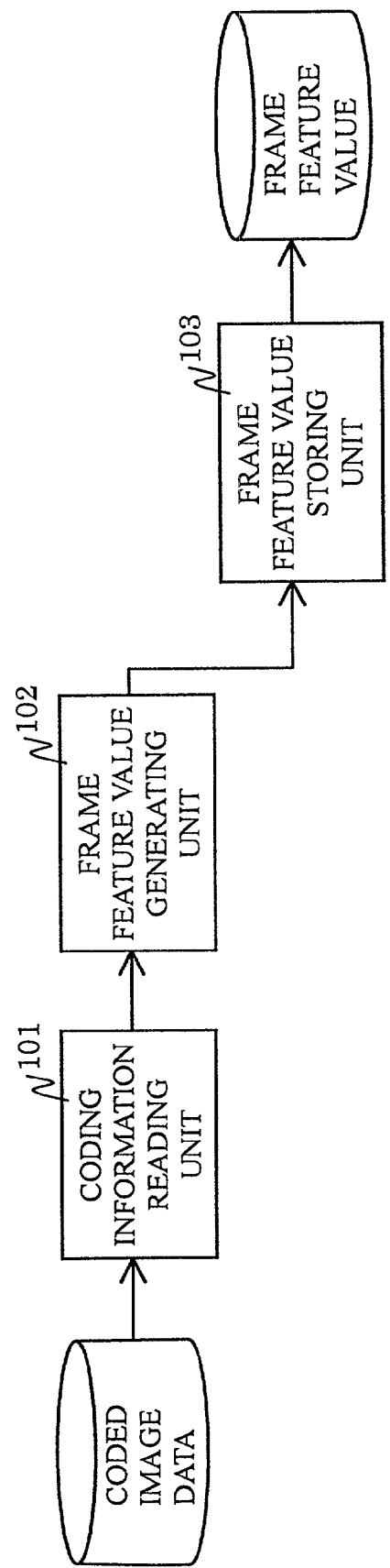
FIG. 1 represents a configuration of an image retrieval information storing apparatus in accordance with a first embodiment of the present invention.

Referring to FIG. 1, the image retrieval information storing apparatus in accordance with the first embodiment includes a coding information reading unit 101, a frame feature value generating unit 102 connected to coding information reading unit 101, and a frame feature value storing unit 103 connected to frame feature value generating unit 102.

Coding information reading unit 101 receives coded image data as an input, and reads and outputs desired coding information included in the image data. Coding information reading unit 101 in the present embodiment extracts and outputs prediction mode information and motion vector information from the coded image data.

Frame feature value generating unit 102 processes each piece of coding information obtained from coding information reading unit 101, and generates and outputs a feature frame value for each frame as a reference for determination of a featured frame.

Frame feature value storing unit 103 stores, in a prescribed storing location, an output from frame feature value generating unit 102. Details of the frame feature value storing unit 103 will be described later.

Figure 2:
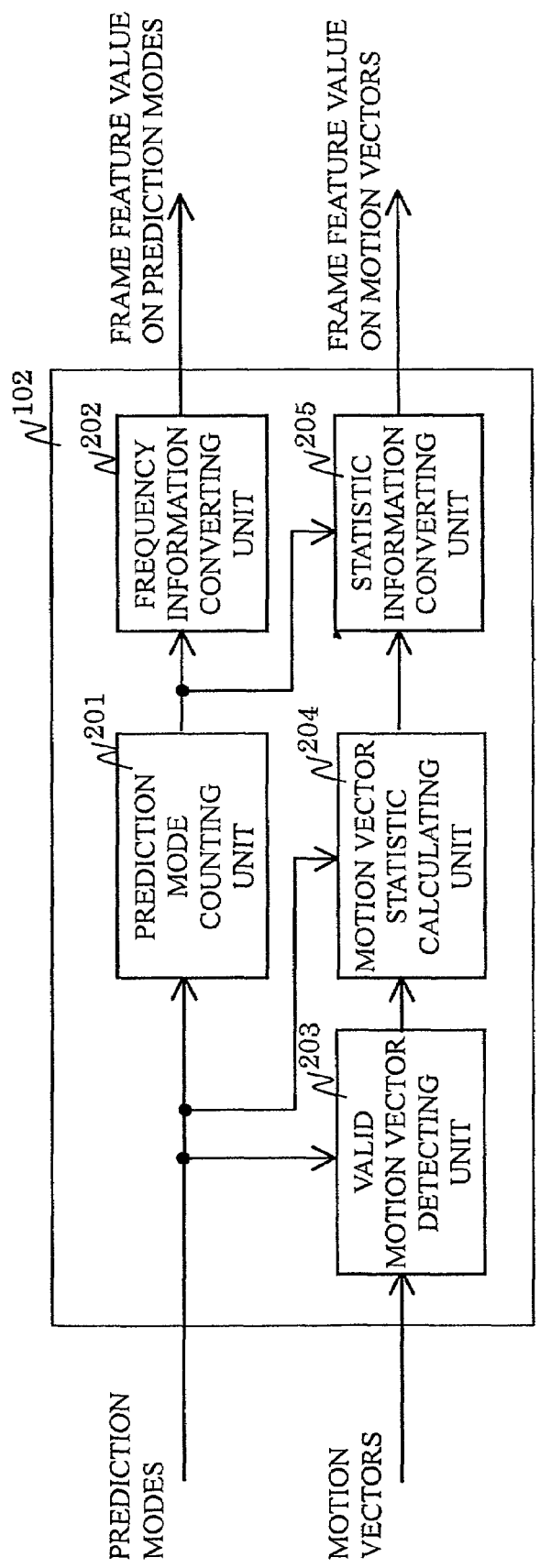
FIG. 2 represents internal configuration of a frame feature value generating unit.

Referring to FIG. 2, frame feature value generating unit 102 includes a prediction mode counting unit 201 connected to coding information reading unit 101, frequency information converting unit 202 connected to prediction mode counting unit 201, a valid motion vector detecting unit 203 connected to coding information reading unit 101, a motion vector statistic calculating unit 204 connected to coding information reading unit 101 and valid motion vector detecting unit 203, and a statistic information converting unit 205 connected to prediction mode counting unit 201 and motion vector statistic calculating unit 204.

The prediction mode information read by coding information reading unit 101 includes prediction coding method for each frame, and prediction method for each coding block in the frame. Prediction mode counting unit 201 counts the number of blocks coded in accordance with respective prediction methods, frame by frame. In a forward prediction coding frame (P frame), the number of I blocks coded in accordance with intraframe prediction and the number of P blocks coded in accordance with interframe prediction are counted, respectively. In a bidirectional prediction coding frame (frame coded by bidirectional prediction) (B frame), the number of I blocks coded in accordance with intraframe prediction, the number of P blocks coded in accordance with forward interframe prediction, the number of B blocks coded in accordance with backward interframe prediction and the number of Bi blocks coded in accordance with bidirectional interframe prediction are counted, respectively.

Further, prediction mode counting unit 201 outputs, as block prediction mode frequency information for each frame, the total number Pp of P blocks for the P frame, and the total number Bf(=P+Bi) of forward interframe prediction blocks (total number of blocks coded in accordance with forward interframe prediction) and total number Bb(=B+Bi) of backward interframe prediction blocks (total number of blocks coded in accordance with backward interframe prediction) for the B frame. Frequency information converting unit 202 converts these pieces of frequency information to attribute information for each frame (in the following, the attribute information related to each frame will be referred to as the "frame feature value"). In the present embodiment, each frame feature value is set such that it represents correlation between the frame of interest and an immediately preceding frame.

Figure 3:
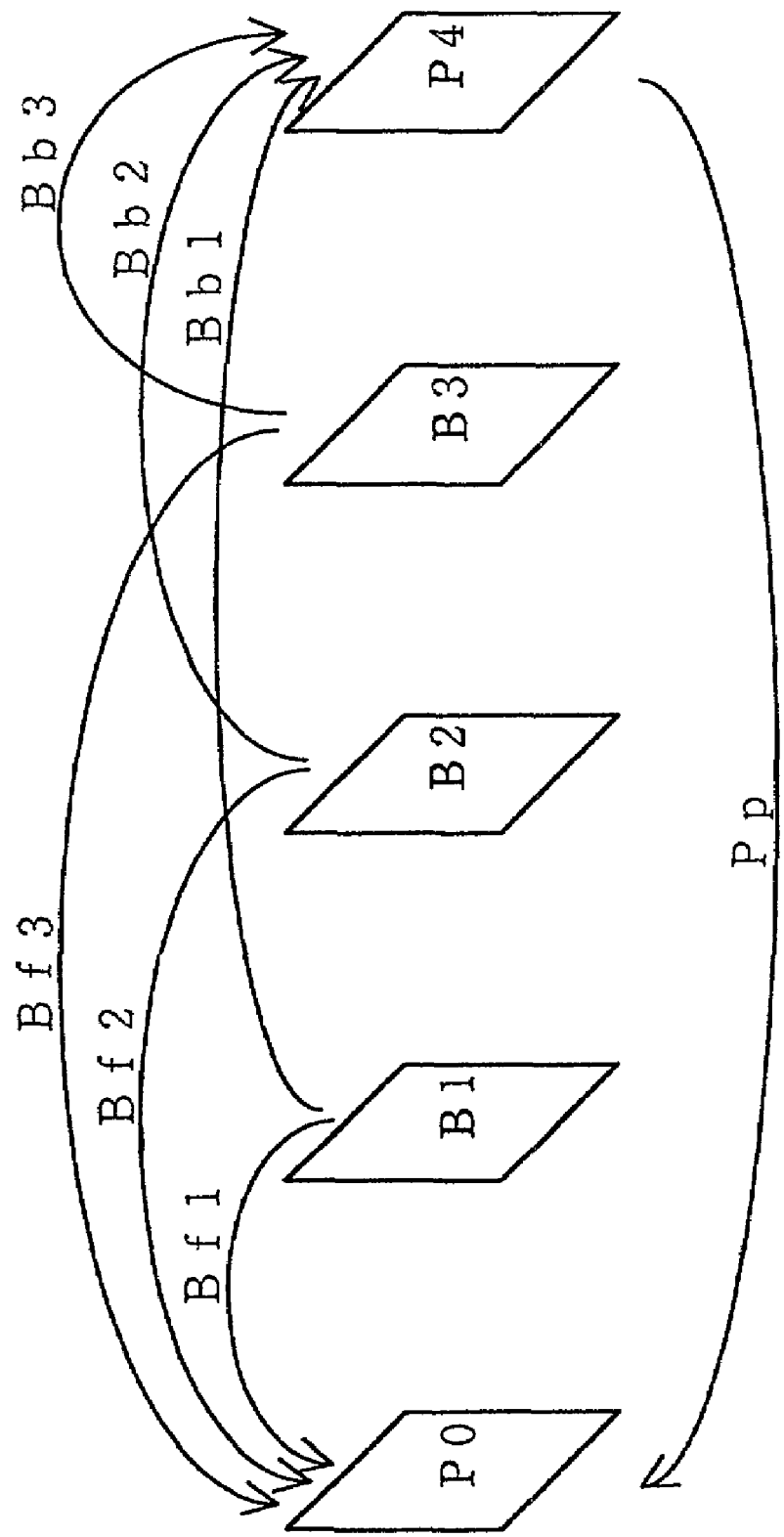
FIG. 3 represents reference relation of frames in prediction coding method.

Referring to FIG. 3, an example of the relation of reference among P and B frames at the time of interframe prediction coding will be described. A starting point of an arrow represents a frame which is an object of coding/decoding, and the end point of the arrow represents a reference frame at the time of coding/decoding. When the reference characters Pp, Bfn, and Bbn (n=1,2,3) allotted to respective arrows represent the aforementioned frequency information, the frame feature value for frame B2, that is, frequency information related to correlation between frames B1 and B2 should be calculated by a prescribed operation from respective block frequency information Pp, Bfn, and Bbn.

In the present embodiment, the value used as the frame feature value of frame B2 is the value of frequency information B$f$2 when frequency information B$f$2 exceeds a certain threshold value, the value of frequency information B$b$1 when frequency information B$f$2 does not exceed the certain threshold value but frequency information Bb1 exceeds the threshold value, and otherwise the value of frequency information B$f$2 or B$b$1 which is larger. The frame feature value of frame B3 is calculated in the similar manner. As to frame B1, the value of frequency information B$f$1 is used as the frame feature value. As to frame P4, the value of frequency information B$b$3 or Pp which is larger is used as the frame feature value. The method of calculating attribute information for each frame is not limited to this. Further, the frequency information of the coded blocks counted by the prediction mode counting unit 201 may be directly regarded as frame feature values.

The valid motion vector detecting unit 203 detects valid motion vector only, from the motion vector information read by coding information reading unit 101. When a camera is moving while being focused on an object, for example, the object and the background of the picked up image may have motion vectors very much different in magnitude or direction. In such a case, valid motion vector detecting unit 203 extracts only that motion vector of an area of interest, for example, the area of the object.

Possible method of separating the object area from the background may include a method in which an average of the motion vectors of the entire frame is calculated and the motion vectors out of the average are successively extracted, and a method in which areas are divided into two by clustering. If the contents of the motion picture come to be more complicated as the number of the objects increases, for example, a method of valid motion vector detection in accordance with the complexity may be used. If the image is not of such a nature, the valid motion vector detection may be unnecessary.

Motion vector statistic calculating unit 204 calculates an average value of the magnitudes of motion vectors corresponding to P block for the P frame over the entire frame, based on the prediction mode information obtained by coding information reading unit 101. Motion vector statistic calculating unit 204 calculates an average value of magnitudes of motion vectors corresponding to all the blocks (Bf) coded in accordance with the forward interframe prediction and all the blocks (Bb) coded in accordance with the backward interframe prediction, for the B frame, over the entire frame. The statistics calculated may not be limited to the average value of vector magnitudes, and different statistics including average vector may be calculated. Further, the motion vector is normalized considering an interval between an object frame and a reference frame at the time of calculation.

Statistic information converting unit 205 converts each of the above described motion vector statistics obtained by motion vector statistic calculating unit 204 to a frame feature value provided for each frame. Similar to the frame feature value based on the prediction mode information, the frame feature value based on the motion vector information in the present embodiment is set such that it indicates the motion information between a frame of interest and an immediately preceding frame. At this time, the coding block frequency information obtained by prediction mode calculating unit 201 is referred to in calculating the motion vector frame feature value.

Referring to FIG. 3, statistic information converting unit 205 uses as the motion vector frame feature value to be allotted to frame B2, an average of magnitudes of all motion vectors corresponding to frequency information B$f$2 and frequency information B$b$1, when values B$f$2 and B$f$1 of frequency information both exceed a certain threshold value for frame B2. Statistic information converting unit 205 uses as motion vector frame feature value, an average of magnitudes of motion vectors corresponding to frequency information B$f$2, when the value of frequency information B$f$2 only exceeds the threshold value. Statistic information converting unit 205 uses as motion vector frame feature value, an average of magnitudes of motion vectors corresponding to frequency information B$b$1, when frequency information Bb1 only exceeds the threshold value. Otherwise, statistic information converting unit 205 uses 0 as the motion vector frame feature value. The motion vector frame feature value allotted to frame B3 is calculated in the similar manner.

For frame B1, statistic information converting unit 205 uses as motion vector frame feature value, an average of magnitudes of motion vector corresponding to frequency information B$f$1 when the value of frequency information B$f$1 exceeds a certain threshold value, and otherwise 0.

For frame P4, statistic information converting unit 205 uses as motion vector frame feature value to be allotted to frame P4, an average of magnitudes of all motion vectors normalized, corresponding to frequency information B$b$3 and frequency information Pp, when values of frequency information B$b$3 and Pp both exceed a certain threshold value. When the value of frequency information B$b$3 only exceeds the threshold values, statistic information converting unit 205 uses as motion vector frame feature value, an average of magnitudes of the motion vectors corresponding to frequency information B$b$3. Otherwise, statistic information converting unit 205 uses 0 as the motion vector frame feature value.

The method of calculating the motion vector frame feature value for each frame is not limited to the above. The motion vector statistics corresponding to respective blocks described above calculated by motion vector statistic calculating unit 204 may be regarded as motion vector frame statistics frame by frame.

The frame feature value on prediction mode and the frame feature value on motion vector obtained in this manner are output from frame feature value generating unit 102 and stored in prescribed storing locations by frame feature value storing unit 103. The storing location of the frame feature value may be a location corresponding to the coded image data of each frame and, for example, it may be stored as a header information of the coded image data of each frame. Alternatively, the frame feature value may be stored as a separate data for image retrieval, independent from the coded image data.

Figure 4:
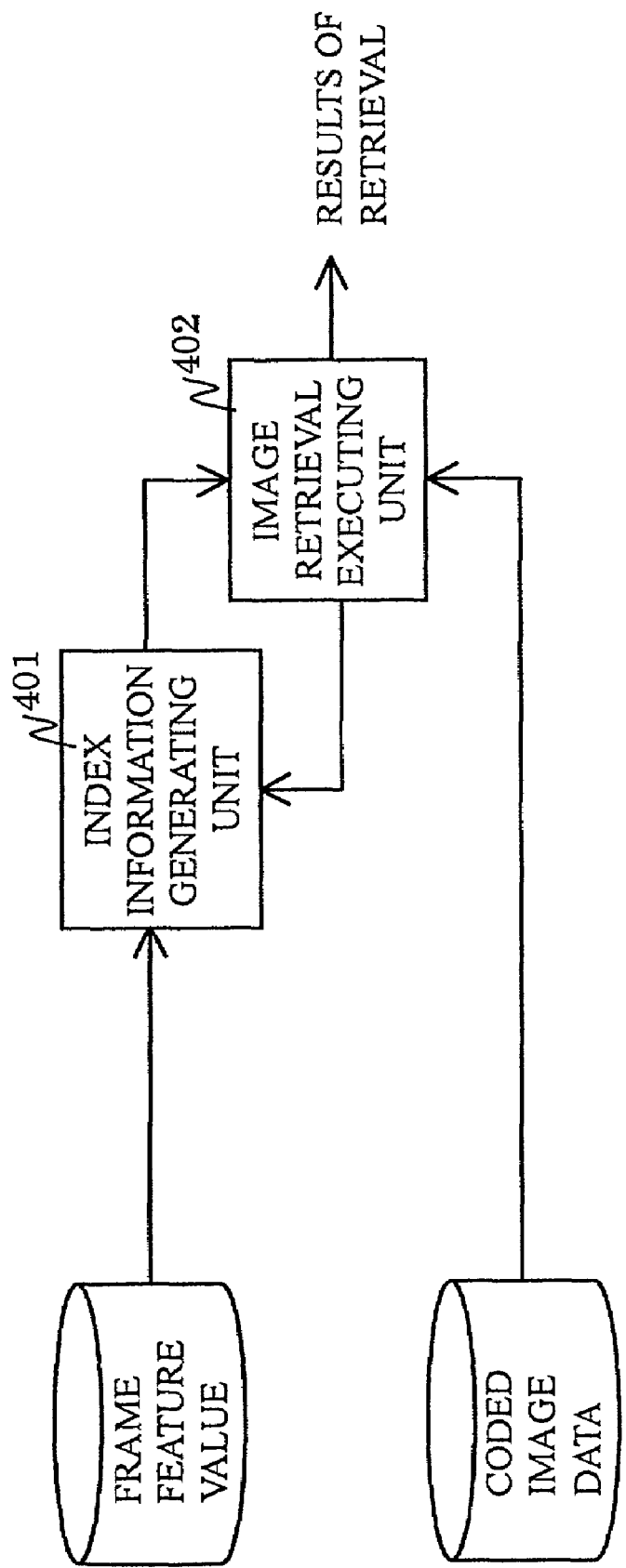
FIG. 4 represents a configuration of an image retrieving apparatus in accordance with the first embodiment of the present invention.

Referring to FIG. 4, the image retrieving apparatus in accordance with the present embodiment includes an index information generating unit 401 connected to an image retrieval executing unit 402, which will be described later, and the image retrieval executing unit 402 connected to index information generating unit 401.

Index information generating unit 401 receives as input the frame feature value stored in the image retrieval information storing apparatus described above, extracts a desired featured frame based on the frame feature value of each frame, and generates and outputs as the index information, the positional information of the featured frame.

The process executed in the image retrieval executing unit 402 will be described later.

Figure 5:
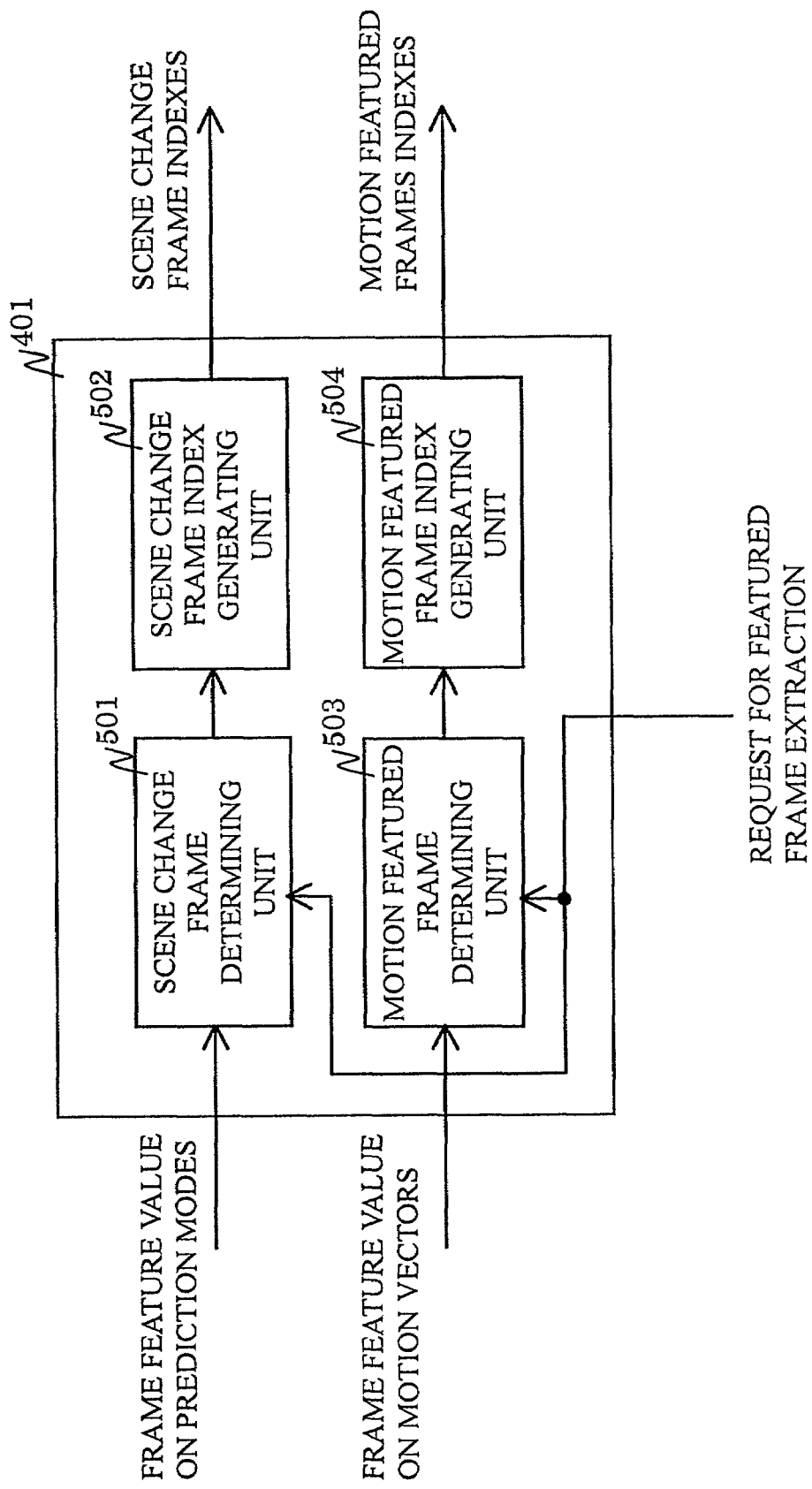
FIG. 5 represents an internal configuration of an index information generating unit.

Referring to FIG. 5, index information generating unit 401 includes a scene change frame determining unit 501, connected to image retrieval executing unit 402, a scene change frame index generating unit 502 connected to scene change frame determining unit 501, a motion featured frame determining unit 503 connected to image retrieval executing unit 402, and a motion featured frame index generating unit 504 connected to motion featured frame determining unit 503.

According to the input frame feature value on prediction mode related to coding, a scene change frame is determined by scene change frame determining unit 501. In the present embodiment, the scene change frame is determined by thresholding the frame feature value on prediction modes for coding. By changing the setting of the threshold value or by adding a process when an adjacent frame is determined to be the scene change frame, the scene change frame to be extracted varies.

In the prior art, the process of extracting a scene change frame has been independent from the image retrieval process, and the method of determining and the like have been fixed. In the present embodiment, the threshold value for determining the scene change or the process of determination is adaptively changed in response to a request for extracting a new featured frame output from the image retrieval executing unit 402 in the process of image retrieval, as will be described later. Accordingly, the desired scene change frames are extracted successively. The scene change frame index generating unit 502 generates, as index information, positional information of the scene change frame determined by the determining unit 501.

Using the frame feature value on motion vector as an input, a featured frame related to magnitude of motion or the like is determined by motion featured frame determining unit 503. In the present embodiment, peak position determination is made based on the frame feature values on motion vectors of neighboring plurality of frames, whereby a frame in which local intensive movement is observed is determined. In addition, a frame having a magnitude larger than a threshold value may be extracted, or a frame of which motion is hardly observed and which intensity of motion is on a minimum level, may be extracted as the motion featured frame.

In the prior art, the process of extracting a motion featured frame has been independent from the image retrieval process, and the method of determination and the like have been fixed. In the present embodiment, the method of determining motion featured frame related to what motion feature is of interest is adaptively changed in the process of retrieval, in response to a request for extracting a new featured frame output from image retrieval executing unit 402 in the process of retrieval, which will be described later. Therefore, desired motion featured frames are extracted successively. The motion featured frame index generating unit 504 generates, as index information, positional information of the motion featured frame determined by the determining unit 503.

The scene change frame index information and motion featured frame index information obtained in this manner are output from index information generating unit 401 and input to image retrieval executing unit 402.

Image retrieval executing unit 402 executes image retrieval based on the input featured frame index information and the coded image data. Image retrieval executing unit 402 obtains positional information of the featured frame from the featured frame index information, and decodes the corresponding frame, using the coded image data. The user recognizes the contents of the motion picture by thumbnail display (catalogue display) or respective featured frames displayed successively, and retrieves a desired image. At this time, when it is determined that the featured frame applied as index information is not suitable for an image retrieval being executed or that the information is insufficient, a request for extracting a new featured frame is issued from image retrieval executing unit 402 to index information generating unit 401. Receiving the request for extracting a new featured frame issued from image retrieval executing unit 402, index information generating unit 401 changes the method of determining featured frames in featured frame determining units 501 and 503, determines a desired featured frame, and outputs the positional information of the featured frame as the index information. The output index information is input to image retrieval executing unit 402, and image retrieval is newly executed.

As described with respect to the index information generating unit 401, the featured frame on motion pictures, such as the scene change frame and the featured frame on motion, may be extracted differently dependent on the manner of determination, and therefore, physical significance of the frame may differ. For example, a frame in which intensive movement is observed and a frame in which movement is hardly observed are frames of completely different features.

When motion picture retrieval is executed, whether it is the best to display a frame in which intensive movement is observed, or a frame with less movement, or a frame having different features on motion as the featured frame of the motion picture depends on the motion picture which is the object of retrieval. Therefore, it is possible that there is a request for switching the featured frame adaptively in the process of retrieval. In such a situation, the image retrieval information storing apparatus described above can immediately meet the request for switching the featured frame in the process of retrieval, as the image retrieval information is stored in the form of frame feature values.

Figure 6:
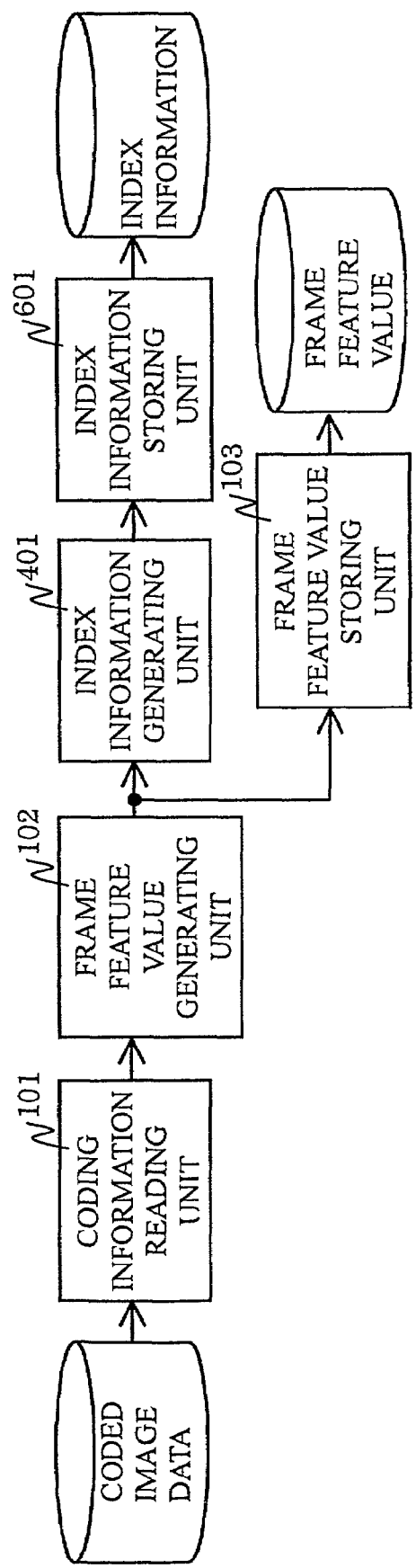
FIG. 6 represents a configuration of the image retrieval information storing apparatus in accordance with the first embodiment of the present invention.

Referring to FIG. 6, it is possible to provide an image retrieval information storing apparatus which includes, in addition to the configuration of the image retrieval information storing apparatus shown in FIG. 1, an index information generating unit 401 generating index information of the featured frames connected to frame future value generating unit 102, and an index information storing unit 601 storing index information, connected to index information generating unit 401. In this manner, index information of predetermined featured frames are separately stored together with the frame feature values. As the frame feature values and featured frame index information are both stored, a request for switching a featured frame in the process of retrieval can be immediately met by using the frame feature value, and high speed retrieval can be executed by using fixed index information when there is no request for switching in the process of retrieval.

Figure 7:
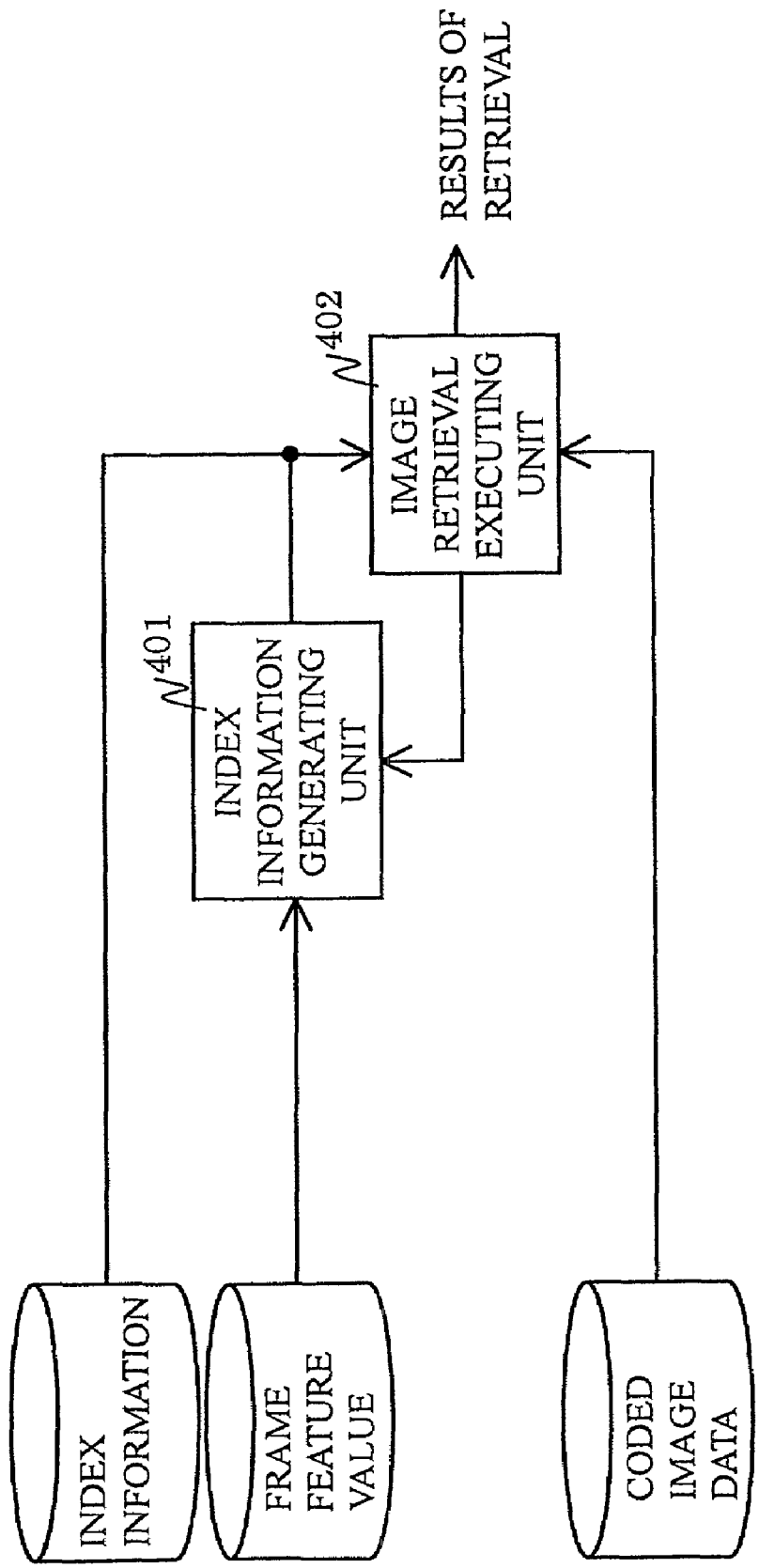
FIG. 7 represents a configuration of the image retrieving apparatus in accordance with the first embodiment of the present invention.

Referring to FIG. 7, the image retrieval apparatus corresponding to the image retrieval information storing apparatus shown in FIG. 6 includes an index information generating unit 401 connected to image retrieval executing unit 402, which will be described later, and the image retrieval executing unit 402 connected to index information generating unit 401.

Index information generating unit 401 has similar structure as index information generating unit 401 described with reference to FIGS. 4 and 5. Therefore, detailed description thereof is not repeated here.

Image retrieval executing unit 402 executes image retrieval based on the coded image data and index information of featured frames, in the similar manner as image retrieval executing unit 402 described with reference to FIG. 4. At this time, the frame index information is applied not only from the index information generating unit 401 but also from prescribed storing locations referred by index information storing unit 601 of FIG. 6.

In the present embodiment, the image retrieval information storing apparatus and the image retrieving apparatus are different apparatuses between which index information and the frame feature values are stored and passed. Such information generated by the image retrieval information storing apparatus may be directly passed to the image retrieving apparatus, and retrieval may be executed on-line.

Second embodiment

Figure 8:
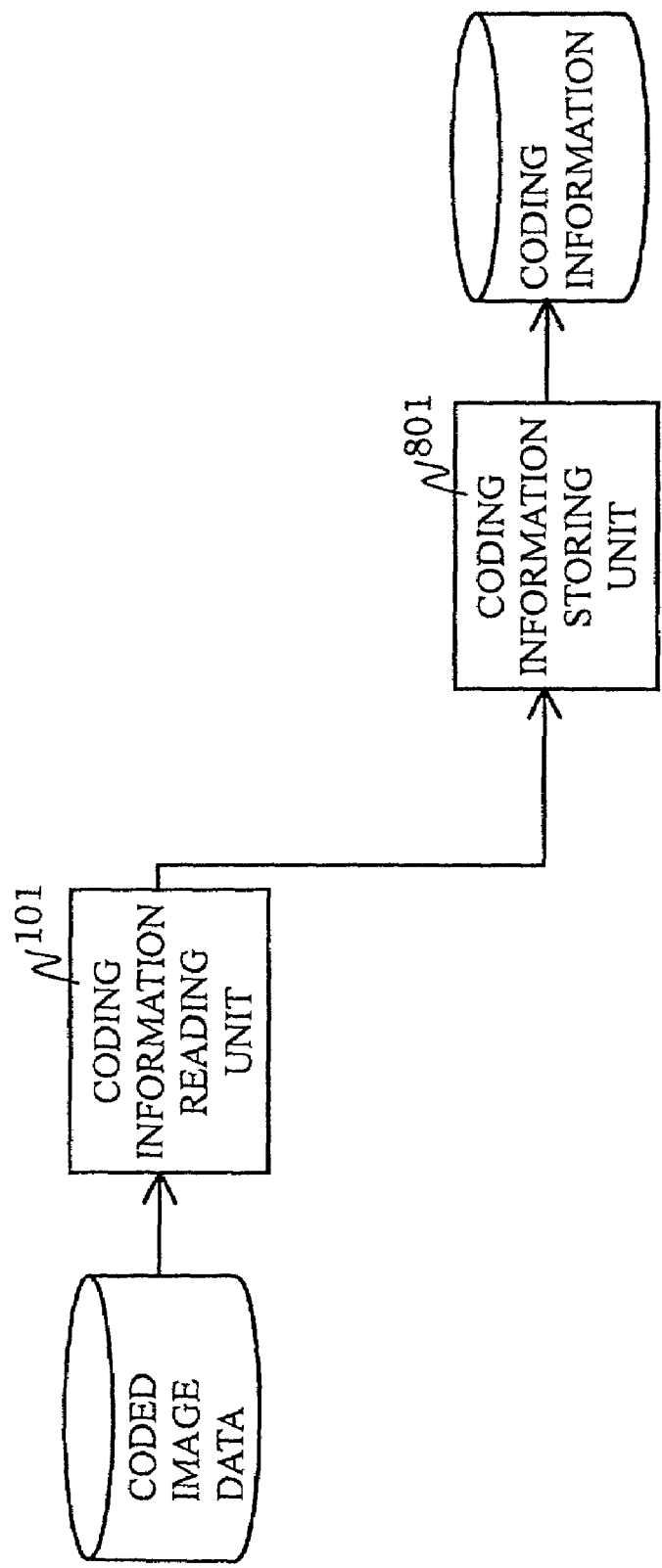
FIG. 8 represents a configuration of the image retrieval information storing apparatus in accordance with a second embodiment of the present invention.

Referring to FIG. 8, the image retrieval information storing apparatus in accordance with the second embodiment includes a coding information reading unit 101, and a coding information storing unit 801 connected to coding information reading unit 101, for storing the coding information read by coding information reading unit 101 at a prescribed storing location. Coding information reading unit 101 is similar to that described in the first embodiment. Therefore, detailed description thereof is not repeated.

The image retrieval information storing apparatus in accordance with the first embodiment above is to store the frame feature value of each frame. In the image retrieval information storing apparatus in accordance with the present embodiment, coding information which is the base for extracting the featured frame read by coding information reading unit 101 is stored in the prescribed storing location by the coding information storing unit 801. By this configuration, what is necessary is simply to read the coding information at the prescribed location, when the featured frame is to be extracted in image retrieval. This improves efficiency as compared with successive reading of the original coded image data. The location for storing coding information may be a position corresponding to the coded image data. For example, it may be stored as header information of the coded image data. Alternatively, the coding information may be stored independent from coded image data, as different data for image retrieval.

Figure 9:
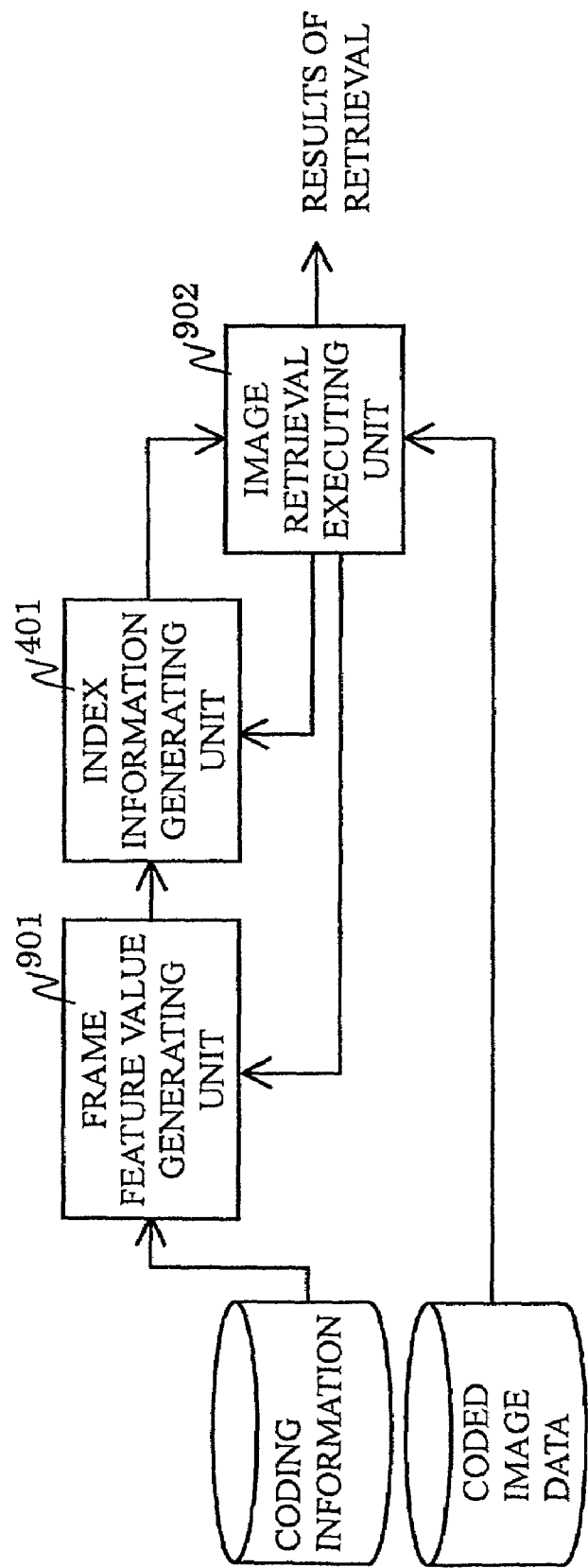
FIG. 9 represents a configuration of the image retrieving apparatus in accordance with the second embodiment of the present invention.

Referring to FIG. 9, the image retrieving apparatus in accordance with the second embodiment includes a frame feature value generating unit 901 connected to image retrieval executing unit 902, which will be described later, and index information generating unit 401 connected to frame feature value generating unit 901 and image retrieval executing unit 902, and the image retrieval executing unit 902 connected to index information generating unit 401.

Frame feature value generating unit 901 receives coding information stored in image retrieval information storing apparatus, and generates and outputs the frame feature value in response to a request for extracting a frame feature value output from image retrieval executing unit 902. Similar to image retrieval executing unit 402 of the first embodiment, image retrieval executing unit 902 obtains positional information of featured frame from index information of the featured frames, and decodes the corresponding frame, using coded image data. At this time, image retrieval executing unit 902 issues a request for extracting a featured frame and a request for extracting frame feature value to index information generating unit 401 and the frame feature value generating unit 901, respectively. Index information generating unit 401 is similar to that described in the first embodiment, and therefore detailed description thereof is not repeated here.

In the present embodiment, an image retrieval information storing apparatus is implemented in a simple configuration in which only the coding information necessary for extracting a featured frame is extracted and stored from the original coded image data. Thus, image retrieval information storing apparatus stores the coding information. Therefore, it is possible for the user to change the method of determining a featured frame based on the frame feature value, and in addition, to change the very method of calculating the frame feature value for extracting the featured frame in the process of retrieval. Thus, more flexible image retrieval is possible.

Figure 10:
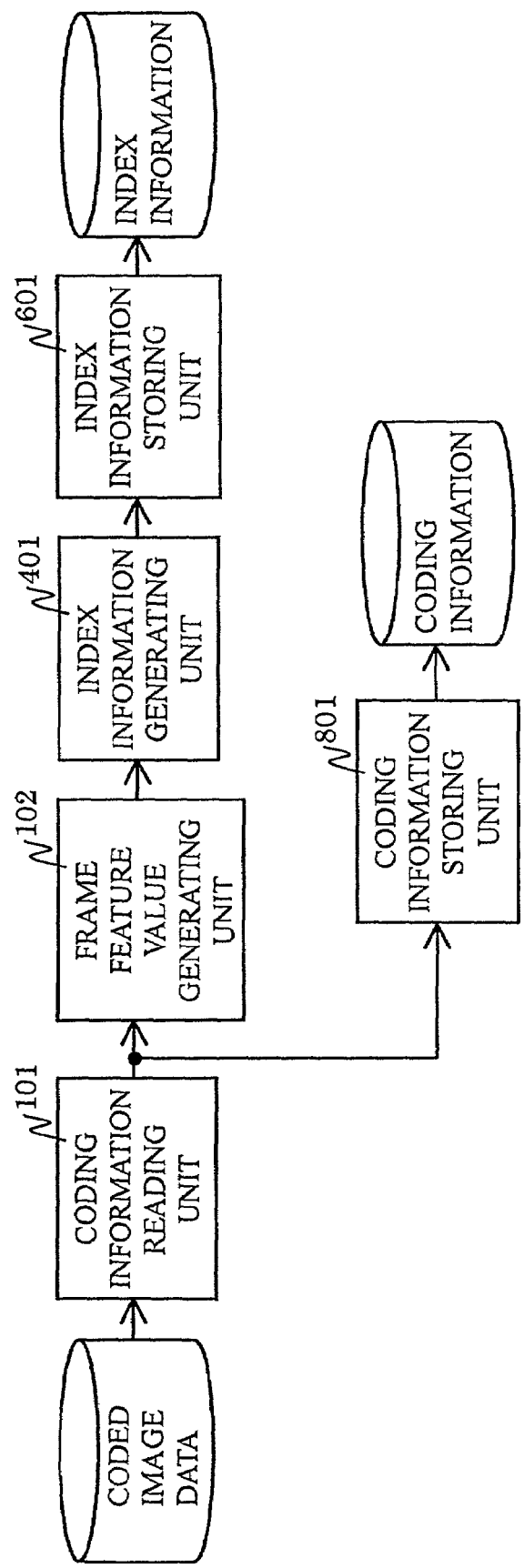
FIG. 10 represents a configuration of the image retrieval information storing apparatus in accordance with the second embodiment of the present invention.

As in the first embodiment, referring to FIG. 10, it is possible to provide an image retrieval information storing apparatus by adding, to the image retrieval information storing apparatus shown in FIG. 8, a frame feature value generating unit 102 connected to coding information reading unit 101 and generating a frame feature value for each frame, an index information generating unit 401 connected to frame feature value generating unit 102 and generating index information of featured frame, and an index information storing unit 601 connected to index information generating unit 401 and storing index information. In this manner, index information of a predetermined featured frame is stored separately, together with coding information necessary for extracting featured frame.

When coding information and featured frame index information are both stored, a request for switching featured frame in the process of retrieval can be met by obtaining the frame feature value based on the stored coding information, and in a retrieval without a request for switching, retrieval at high speed utilizing fixed index information can be performed.

Figure 11:
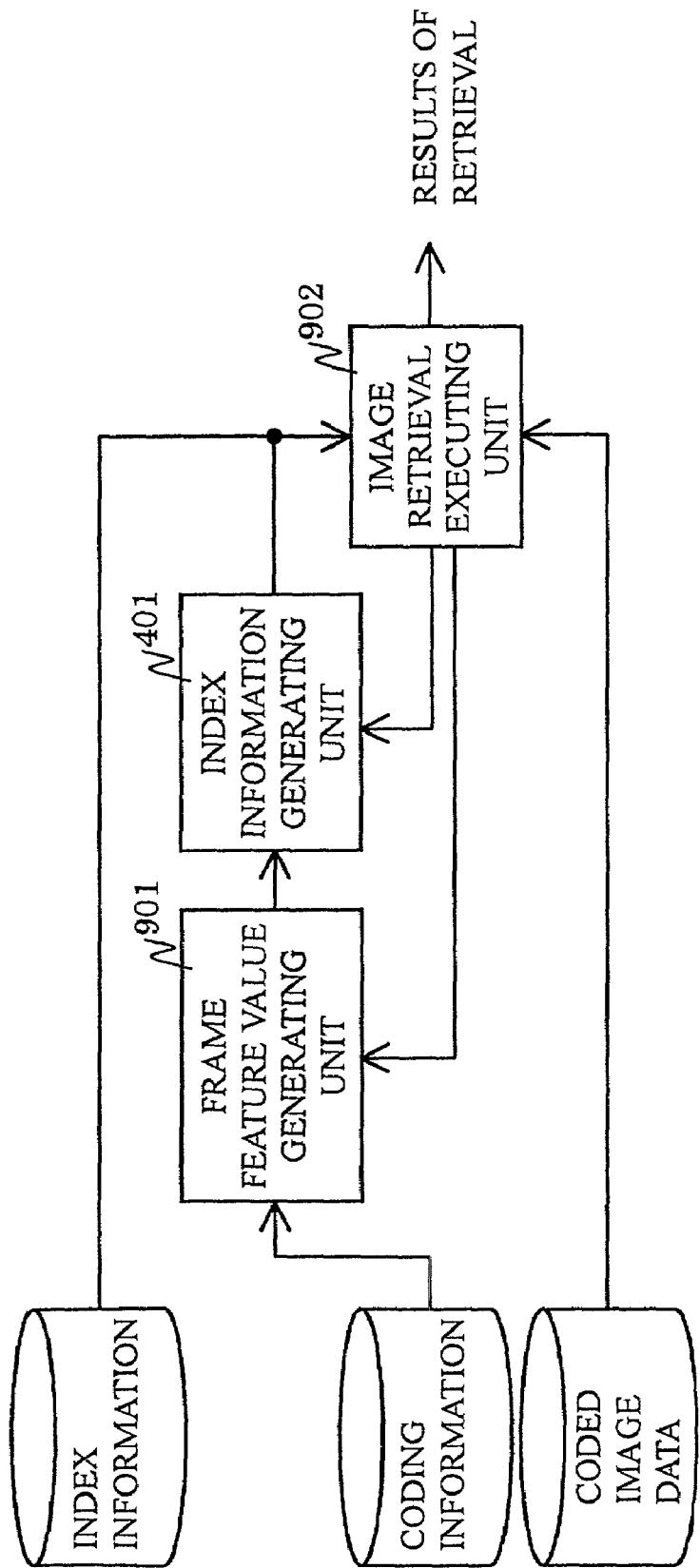
FIG. 11 represents a configuration of the image retrieving apparatus in accordance with the second embodiment of the present invention.

Referring to FIG. 11, the image retrieving apparatus corresponding to the image retrieval information storing apparatus shown in FIG. 10 includes a frame feature value generating unit 901 connected to image retrieval executing unit 902, which will be described later, an index information generating unit 401 connected to frame feature value generating unit 901 and image retrieval executing unit 902, and the image retrieval executing unit 902 connected to index information generating unit 401.

Frame feature value generating unit 901 and index information generating unit 401 are similar to those described with reference to FIG. 9. Therefore, detailed description thereof is not repeated here. Image retrieval executing unit 902 executes image retrieval based on the coding image data and index information of the featured frame, as image retrieval executing unit 902 described with reference to FIG. 9. At this time, the frame index information is applied not only from the index information generating unit 401 but also from a prescribed storing location referred by index information storing unit 601 of FIG. 10.

In the image retrieval information storing apparatuses of the first and second embodiments, the frame feature value for each frame and coding information necessary for extracting the featured frame are stored. These are not incompatible, and therefore the frame feature value and the coding information necessary for extracting the featured frame may be stored together. Further, the index information, the frame feature value and the coding information necessary for extracting the featured frame may be all stored and utilized at the time of image retrieval.

Third Embodiment

Figure 12:
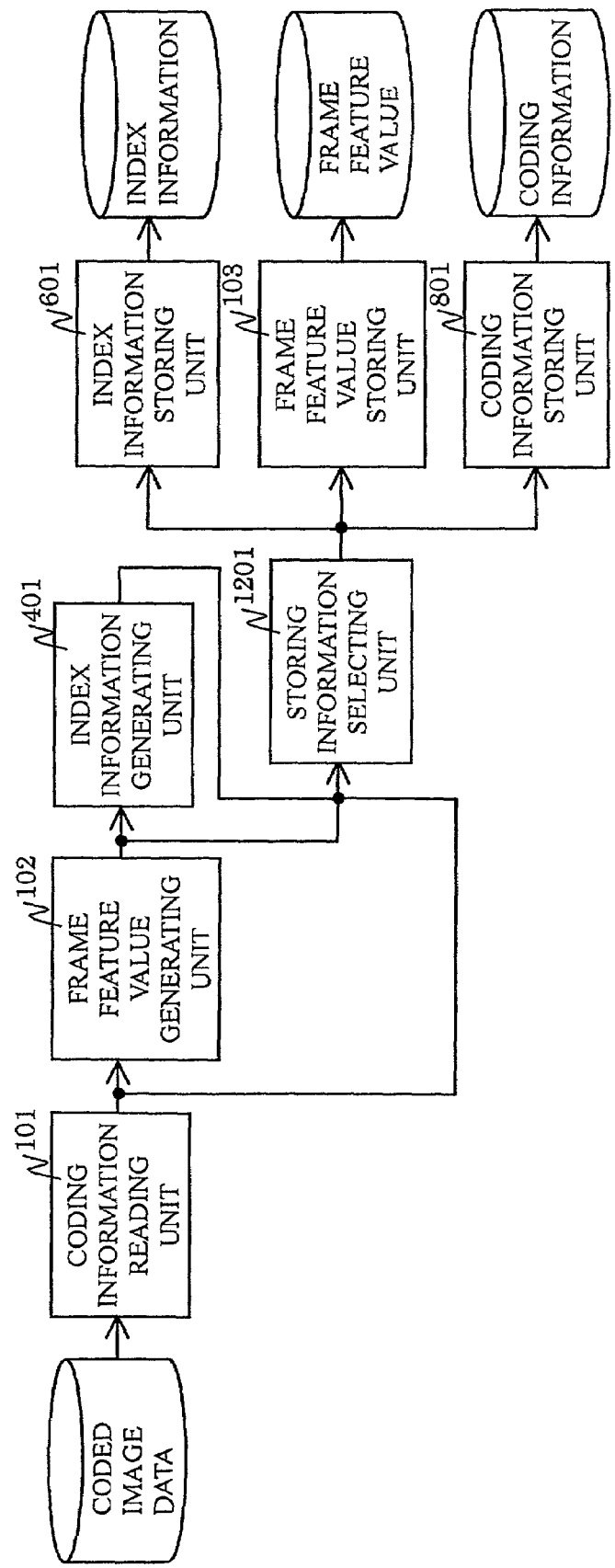
FIG. 12 represents a configuration of the image retrieval information storing apparatus in accordance with a third embodiment of the present invention.

Referring to FIG. 12, the image retrieval information storing apparatus in accordance with the third embodiment includes a coding information reading unit 101, a frame feature value generating unit 102 connected to coding information reading unit 101, an index information generating unit 401 connected to frame feature value generating unit 102, a storing information selecting unit 1201 connected to coding information reading unit 101, frame feature value generating unit 102 and index information generating unit 401, an index information storing unit 601, a frame feature value storing unit 103 and a coding information storing unit 801, each connected to storing information selecting unit 1201.

Coding information reading unit 101, frame feature value generating unit 102 and index information generating unit 401 are similar to those of the first embodiment. Therefore, detailed description thereof is not repeated here. Storing information selecting unit 1201 selects and outputs one, two or all of index information, frame feature value and the coding information necessary for extracting the featured frame, dependent on the situation. Index information storing unit 601, frame feature value storing unit 103 and coding information storing unit 801 store the index information, the frame feature value and coding information selected by storing information selecting unit 1201 at prescribed storing locations, respectively.

In the first embodiment, it has been described that the featured frame for a motion picture such as a scene change frame and a featured frame related to motion may be extracted differently dependent on the manner of determination, and that physical meaning of the frame may differ. For example, a frame in which rapid movement is observed and a frame in which movement is very small are frames having different features. When motion picture retrieval is executed, whether it is appropriate to display a frame with rapid movement, or a frame with less movement, or different frame having different feature related to motion as the featured frame for the motion picture depends on the motion picture which is the object of retrieval. Therefore, there may be a request for switching the condition of extracting the featured frame adaptively in the process of retrieval.

In such a situation, the request for switching in the process of retrieval may be immediately met when the image retrieval information is stored in the form of frame feature value or in the form of coding information, by the storing information selecting unit 1201.

When there is some knowledge of the motion picture which is the object of retrieval in advance and appropriate featured frame has been known, it is possible by storing the image retrieval information in the form of index information of the featured frame by storing information selecting unit 1201, to reduce the amount of information for image retrieval, and to execute retrieval at high speed. Further, when the frame feature value or the coding information, and the index information of the featured frame are to be stored together by the storing information selecting unit 1201, it is possible to meet the request for switching in the process of retrieval immediately, and to execute retrieval at high speed.

Figure 13:
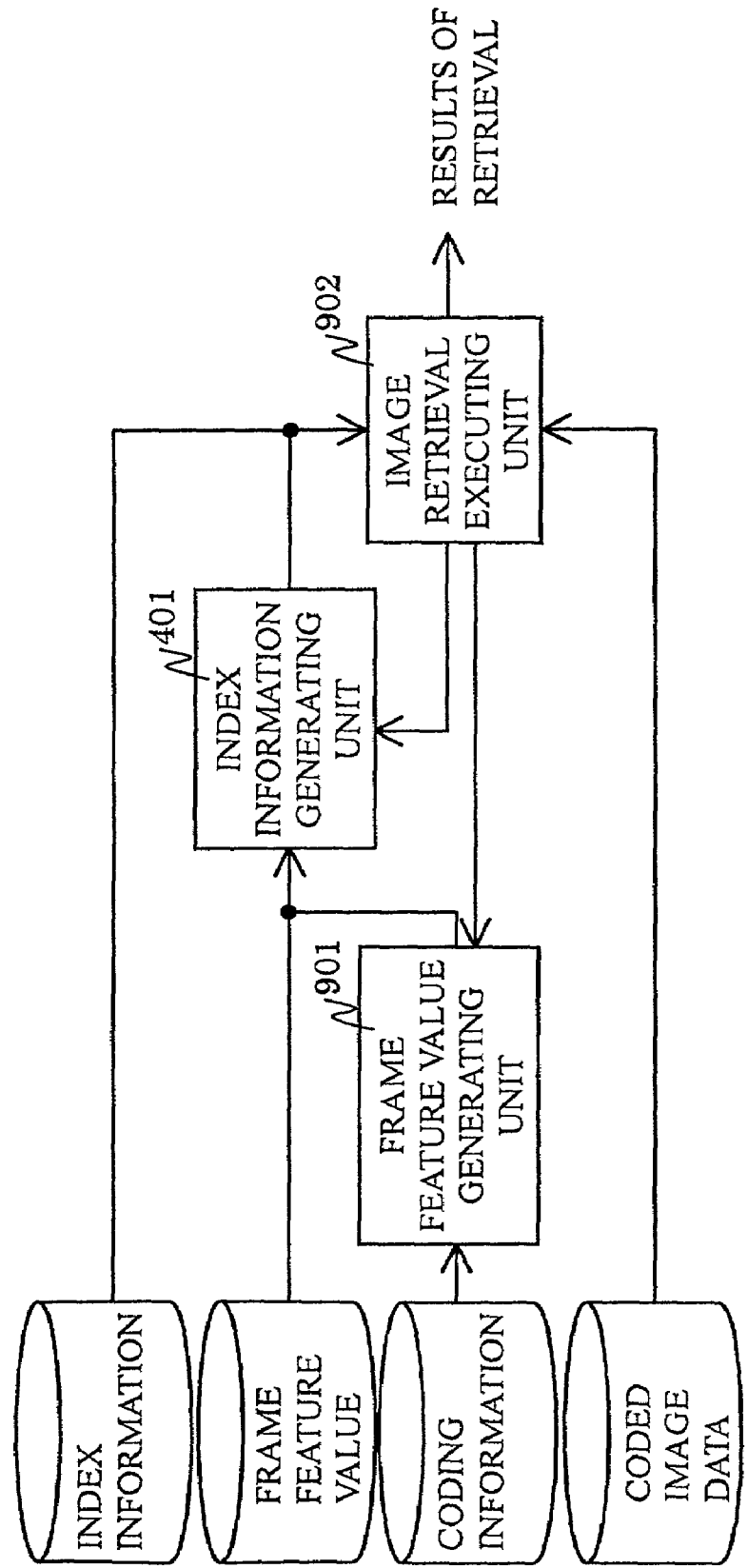
FIG. 13 represents a configuration of the image retrieving apparatus in accordance with a third embodiment of the present invention.
Figure 14:
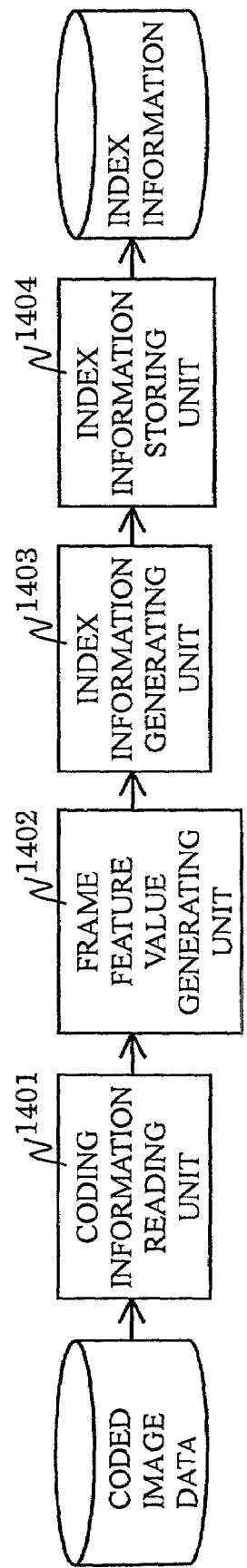
FIG. 14 represents a configuration of a conventional image retrieval information storing apparatus.
Figure 15:
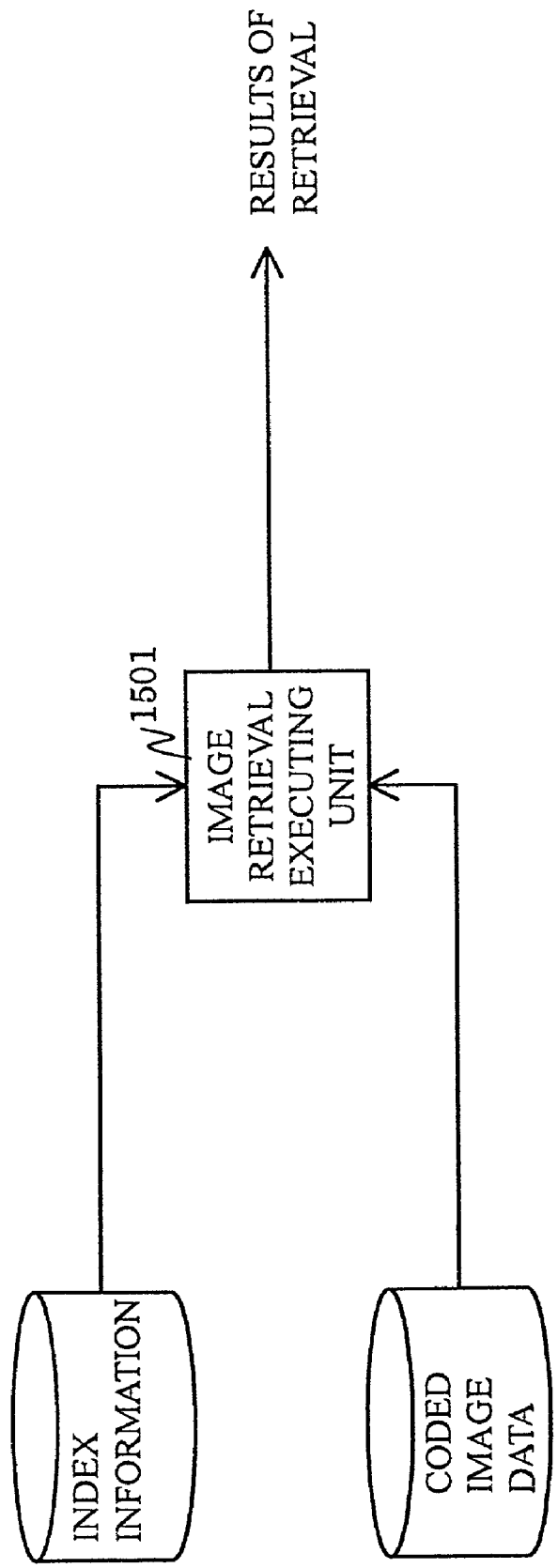
FIG. 15 represents a configuration of a conventional image retrieving apparatus.

Referring to FIG. 13, the image retrieving apparatus in accordance with the third embodiment includes a frame feature value generating unit 901 connected to image retrieval executing unit 902, which will be described later, an index information generating unit 401 connected to frame feature value generating unit 901 and image retrieval executing unit 902, and the image retrieval executing unit 902 connected to index information generating unit 401.

Frame feature value generating unit 901 receives, as an input, coding information stored in image retrieval information storing apparatus. Index information generating unit 401 receives, as an input, frame feature value generated by frame feature value generating unit 901 and the frame feature value stored in the image retrieval information storing apparatus. Image retrieval executing unit 902 receives as inputs the index information stored in image retrieval information storing apparatus and the index information generated by index information generating unit 401. Index information generating unit 401 is similar to that described in the first embodiment. Therefore, detailed description thereof is not repeated here. Frame feature value generating unit 901 and image retrieval executing unit 902 are similar to those described in the second embodiment. Therefore, detailed description thereof is not repeated here.

When there is index information, it is possible for the image retrieving apparatus to obtain the position of the featured frame based on the index information, decode the featured frame based on the input coded image data, display the same and to execute the image retrieval. When a new featured frame is required in the process of image retrieval and there is the frame feature value, the image retrieving apparatus extracts the new featured frame based on the frame feature value, and generates the index information to be used for image retrieval.

When it is determined that the frame feature value is inappropriate and there is coding information, the image retrieving apparatus generates a new frame feature value based on the coding information, extracts the new featured frame from thus generated new frame feature value, and generates index information to be used for image retrieval.

The advantage of storing both the frame feature value and the coding information is that image retrieval with such a high degree of freedom is possible.

When there is coding information and not the input frame feature value, the request for extracting a new featured frame is directly issued to the frame feature value generating unit 901.

In this manner, in the image retrieval information storing apparatus in accordance with the third embodiment, the information to be stored is selected by the storing information selecting unit 1201 dependent on the nature of the image which is the object of retrieval. Therefore, appropriate image retrieval information is stored, and adaptive image retrieval can be executed by the image retrieving apparatus. Further it is possible to select the stored information by storing information selecting unit 1201 dependent on the rate of execution of retrieval or on the restriction of storing capacity.

As to the capacity of image retrieval information, the index information, the frame feature value and coding information have capacities larger in this order. For example, when the storage capacity of the storing location for image retrieval information is small, only the index information having small capacity is stored. When the storing capacity is sufficiently large and the rate of executing retrieval is slow, all the information is stored to ensure degree of freedom of retrieval, and index information is fully made use of so as not to lower the execution rate.

Further, it is possible to limit the image retrieval information to be stored to only two of the index information, frame feature value and the coding information necessary for extracting featured frame, and to select the stored information by storing information selecting unit 1201.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image retrieval information storing apparatus for storing frame feature values in association with a plurality of frames of image data, comprising:
    a calculating unit for calculating statistics of motion vector information related to said image data;
    a frame feature value generating unit for generating a frame feature value which is numerical information representing quantity of a feature contained in a frame of said image data using the calculated statistics; and
    a frame feature value storing unit for storing said frame feature value in correlating form with the frame of said image data, the frame feature value storing unit being connected to said frame feature value generating unit.

2. The image retrieval information storing apparatus according to claim 1, further comprising:
    a coding information reading unit for reading motion vector information from said image data which is coded; and
    said frame feature value generating unit generates said frame feature value based on said motion vector information.

3. An image retrieving apparatus, comprising:
    an index information generating unit for receiving a frame feature value which is numerical information representing quantity of a feature contained in a frame of image data, for determining a featured frame among said image data based on said frame feature value in accordance with a request for extracting a featured frame, and for generating index information which is positional information of said featured frame,
    a calculating unit for calculating said frame feature value by analyzing said image data including associated data for coding the image, and the frame feature value not being an original form in said image data;
    an image retrieval executing unit connected to said index information generating unit, for transmitting said request for extracting said featured frame to said index information generating unit, for receiving said index information from said index information generating unit, for receiving said image data from an external source, and for outputting a frame specified based on said index information, and
    an index information changing unit for adaptively changing said index information by changing a setting of a threshold value during image retrieval.

4. The image retrieving apparatus according to claim 3, wherein said image retrieval executing unit is connected to said index information generating unit, transmitting said request for extracting a featured frame to said index information generating unit, receiving said index information from said index information generating unit, and also receiving said image data and index information from an external source, and outputting a frame specified based on said index information received from said index information generating unit or said index information from said external source.

5. The image retrieving apparatus according to claim 4, wherein
    said index information generating unit includes
    a frame determining unit receiving said frame feature value and said request for extracting a featured frame, comparing said frame feature value and the threshold value in accordance with said request for extracting a featured frame, and determining said featured frame, and
    an index generating unit connected to said frame determining unit and generating index information which is positional information of said featured frame.

6. The image retrieving apparatus according to claim 3, wherein said index information generating unit includes
    a frame determining unit receiving said frame feature value and said request for extracting a featured frame, comparing said frame feature value and the threshold value in accordance with said request for extracting a featured frame, and determining said featured frame, and
    an index generating unit connected to said frame determining unit and generating index information which is positional information of said featured frame.

* * * * *